United States Patent [19]

Tanaka et al.

[11] 4,271,217
[45] Jun. 2, 1981

[54] PROCESS FOR PRODUCING POLYURETHANE RESINS AND SHEET MATERIALS

[75] Inventors: Itsuya Tanaka, Kyoto; Toshikazu Fujii, Neyagawa, both of Japan

[73] Assignee: Sanyo Chemical Industries, Ltd, Kyoto, Japan

[21] Appl. No.: 20,057

[22] Filed: Mar. 13, 1979

[30] Foreign Application Priority Data

Mar. 31, 1978 [JP] Japan ................... 53/38640

[51] Int. Cl.³ ............. B32B 27/40; D03D 27/00; D04H 11/00; D05C 17/00
[52] U.S. Cl. .................................. 428/96; 427/154; 427/155; 427/385.5; 427/389.9; 428/425.1; 528/71; 428/320; 428/290
[58] Field of Search ............... 427/385 B, 390 R, 391, 427/154, 155, 156; 428/425, 96; 528/71; 8/178 E

[56] References Cited

U.S. PATENT DOCUMENTS

| | | | |
|---|---|---|---|
| 3,479,310 | 11/1969 | Dieterich | 260/29.2 TN |
| 3,518,045 | 6/1970 | Rellensmann et al. | 528/71 X |
| 3,535,274 | 10/1970 | Dieterich et al. | 260/29.2 TN X |
| 3,655,619 | 4/1972 | Sellet | 528/71 X |
| 3,686,108 | 8/1972 | Reiff et al. | 260/29.2 TN |
| 3,823,118 | 7/1974 | Matsunaga et al. | 528/71 X |
| 3,873,484 | 3/1975 | Bluestein et al. | 528/71 X |
| 3,971,764 | 7/1976 | Schürmann | 528/71 X |
| 4,086,193 | 4/1978 | Reischl | 528/71 X |

Primary Examiner—Ralph S. Kendall
Assistant Examiner—Thurman K. Page
Attorney, Agent, or Firm—Oblon, Fisher, Spivak, McClelland & Maier

[57] ABSTRACT

A water-insoluble, water-nondispersible polyurethane resin and a sheet material with improved physical properties and dyeability are produced by using a quaternary nitrogen atom-containing polyol and a low-molecular weight polyfunctional compound having no quaternary or tertiary nitrogen atom.

31 Claims, No Drawings

PROCESS FOR PRODUCING POLYURETHANE RESINS AND SHEET MATERIALS

BACKGROUND OF THE INVENTION

1. Field of the Invention

This invention relates to a process for producing water-insoluble water-nondispersible polyurethane resins and sheet materials. More particularly, it relates to a process for producing polyurethane resins and microporous sheet materials having improved physical properties (such as mechanical strength and water resistance) and storage stability in addition to excellent dyeing properties such as dye-receptivity and color fastness to light, washing and rubbing.

2. Description of the Prior Art

It is known to introduce salt-like groups (such as quaternary nitrogen atoms) into polyurethane resins to impart hydrophilic properties (water-solubility or water-dispersibility), but such resins have poor physical properties (such as mechanical strength and water resistance) and therefore are not suitable as resins for producing sheet materials (such as synthetic leathers).

It has been proposed to produce sheet materials from polyurethane resins obtained by using a polymer polyol derived from an ethylenically unsaturated monomer and a high-macromolecular diol, but there may be some disadvantages such as discoloration or color change (yellowing) tendency and insufficient processability due to slow rates of solvent removal in making the sheet materials by a wet process.

SUMMARY OF THE INVENTION

Accordingly, it is one object of this invention to provide water-insoluble, water-nondispersible polyurethane resins and sheet materials with improved physical properties (such as mechanical strength and water resistance).

It is another object of this invention to provide water-insoluble, water-nondispersible polyurethane resins and sheet materials having no or little discoloration tendency and having improved processability in addition to improved dyeability (such as dye-receptivity and color fastness to light, washing and rubbing).

Briefly, these and other objects of the invention as hereinafter will become more readily apparent have been attained broadly by providing: a process for producing water-insoluble, water-nondispersible polyurethane resins comprising reacting an organic diisocyanate (A) with active hydrogen atom-containing compounds comprising a macromolecular polyol (B) and a low-molecular weight polyfunctional compound (C), wherein (1) a part of the active hydrogen atoms-containing compounds is at least one quaternary nitrogen atom-containing polyol (D) selected from the group consisting of low-molecular weight polyols, polyether polyols and polyester polyols having at least one quaternary nitrogen atom, and (2) at least a part of (C) is a low-molecular weight polyfunctional compound (E) having no nitrogen atom other than the functional group; and a process for producing sheet materials comprising applying to a substrate a solution of a polyurethane resin obtained by reacting an organic diisocyanate (A) with active hydrogen atom-containing compounds comprising a macromolecular weight diol (B₁) and a low-molecular bifunctional compound (C₁), wherein (1) a part of the active hydrogen atom-containing compounds is at least one quaternary nitrogen atom-containing diol (D₁) selected from the group consisting of low-molecular diols, polyether diols and polyester diol having at least one quaternary nitrogen atom, and (2) at least a part of (C₁) is a low-molecular weight bifunctional compound (E₁) having no nitrogen atom other than the functional group.

DESCRIPTION OF THE PREFERRED EMBODIMENTS

[1] QUATERNARY NITROGEN-CONTAINING POLYOL

As the quaternary nitrogen atom-containing polyol (D) to be used as a part of the active hydrogen atom-containing compounds may be used a low molecular weight polyol, a polyether polyol or a polyester polyol, having at least one quaternary nitrogen atom, or a combination thereof.

(I-1) LOW-MOLECULAR POLYOL CONTAINING QUAT.-N

Suitable quaternary nitrogen atom-containing low-molecular polyols include quaternization products from a tertiary nitrogen atom-containing low-molecular weight hydroxy compound having a molecular weight per hydroxyl group of generally 300 or less, preferably 45–230. Examples of such quaternization products include:

(a) Those obtainable by usual quaternization of tertiary nitrogen atom-containing low-molecular polyhydroxy compounds with conventional quaternizing agents;

(b) Those obtainable by quaternization of tertiary nitrogen atom-containing low-molecular weight mono- or poly-hydroxy compounds with OH-containing quaternizing agents such as alkylene halohydrins; and (c) Those obtainable by quaternization of low-molecular weight mono- or poly-hydroxy compounds containing tertiary nitrogen atoms present in the form of salts with such quaternizing agents capable of forming OH-groups as alkylene oxides.

Suitable tertiary nitrogen atom-containing low-molecular weight polyhydroxy compounds in (a) include these compounds represented by the following general formulas (1)–(4):

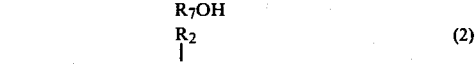

wherein $R_1$ is a monovalent hydrocarbon group or a substituted monovalent hydrocarbon group; $R_2$ and $R_3$ are independently a hydrogen atom, an alkyl group or a cycloalkyl group; $R_4$ and $R_5$ are independently an alkyl group or a cycloalkyl group; $R_6$, $R_7$ and $R_8$ are independently an alkylene group or a cycloalkylene group; n is zero or a positive integer.

In $R_1$, the monovalent hydrocarbon groups have usually 1 to 20 (preferably 1 to 5) carbon atoms, and there may be mentioned an alkyl (such as methyl, ethyl, n-and i-propyl, butyl, octyl), cycloalkyl (such as cyclohexyl), aryl (such as phenyl, naphthyl), aralkyl (such as benzyl) or alkaryl (such as tolyl.

Examples of the substituted monovalent hydrocarbon groups are tertiary nitrogen atom-containing hydrocarbon groups such as dialkylaminoalkyl, morpholinoalkyl and phenyl-alkylaminoalkyl groups; and hydroxyl-substituted hydrocarbon groups such as hydroxyalkyl groups (such as hydroxyethyl, hydroxypropyl groups).

As the tertiary nitrogen atom-containing polyhydroxy compounds represented by the above formulas (1)–(4) there may be illustrated those described in Japanese Patent Publication No. 17520/1975. Suitable examples are the following:

(I) The compounds of general formula (1):
Alkyldialkanolamines, such as $(HOCH_2CH_2)_2N(CH_3)$, $(HOCH_2)_2N(CH_2CH_2CH_3)$ etc., and aryldialkanolanines, such as $(HOCH_2CH_2)_2N(C_6H_5)$ etc.;

(II) The compounds of general formula (2):
N.N'-dialkanol derivative of piperidine, such as

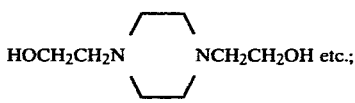

(III) The compounds of general forumla (3):

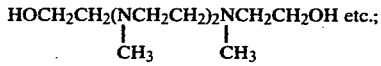

(IV) The compounds of general formula (4):
$(HOCH_2CH_2)_2CHN(CH_2CH_2CH_2CH_3)_2$, $(HOCH_2)_2C(CH_3)CH_2N(CH_2CH_3)_2$ etc.

Suitable above-mentioned conventional quaternizing agents in (a) include alkyl halides (such as methyl chloride, methyl bromide, ethyl bromide and butyl bromide), alkenyl halides (such as allyl chloride), aralkyl halides (such as benzyl chloride and benzyl bromide), dialkyl sulfates (such as dimethyl sulfate and diethyl sulfate), epihalohydrins (such as epichlorohydrin), salts of monochloroacetic acid (such as sodium salt of monochloroacetic acid) or esters of monochloroacetic acid (such as methyl ester of monochloroacetic acid).

Among these quaternizing agents, the preferred are alkyl halides are aralkyl halides. Suitable tertiary nitrogen atom-containing low-molecular weight polyhydroxy compounds mentioned in (b) include the same ones as mentioned in (a). Suitable tertiary nitrogen atom-containing low-molecular weight monohydroxy compounds include N,N-dialkylalkanolamines (such as N,N-dimethylethanolamine, N,N-diethylpropanolamine and N-lauryl-N-methylethanolamine). Suitable alkylene halohydrins to be used as quaternizing agents include 2-bromoethanol.

Suitable tertiary nitrogen atom-containing low-molecular weight polyhydroxy compounds present in the form of salts mentioned in (c) include salts of the polyhydroxy compounds mentioned in (a) with organic or inorganic acids. Suitable tertiary nitrogen atom-containing monohydroxy compounds present in the form of salts include salts of the monohydroxy compounds mentioned in (b) with organic or inorganic acids. Suitable organic or inorganic acids usable for the salt formation include, for example, formic, acetic, propionic, butyric, valeric, caproic and heptanoic acid as well as hydrochloric, sulfuric, nitric and phosphoric acid. Suitable alkylene oxides usable for quaternization include alkylene oxides containing 2–4 carbon atoms, such as ethylene oxide, propylene oxide and butylene oxides.

(I-2) POLYETHER POLYOL CONTAINING QUAT.-N

Suitable quaternary nitrogen atom-containing polyether polyols include those obtainable by quaternization of a tertiary nitrogen atom-containing polyether polyol, and those obtainable by addition of one or more alkylene oxides to a quaternary nitrogen atom-containing polyol. Among these, the former are preferred. Suitable tertiary nitrogen atom-containing polyether polyols in the former include, for example, addition products of one or more alkylene oxides to an active hydrogen atom-containing amine. Suitable examples of such amines include tertiary nitrogen atom-containing low-molecular weight hydroxy compounds, as mentioned above in (I-1); and precursors thereof (such as alkyl-, cycloalkyl, aralkyl- or alkaryl-amines, piperidine, and N-alkyl-substituted alkylene diamines or polyalkylene polyamines). Suitable alkylene oxides include alkylene oxides having 2–4 carbon atoms, such as ethylene oxide, propylene oxide, 1,2-, 1,3-, 2,3) butylene oxides and tetrahydrofuran. (In the case where two or more alkylene oxides are used, they may be added in random or block.) The addition of alkylene oxides can be carried out in the usual ways. The quaternization of the polyether polyol may be carried out by the similar methods as described in (a), (b) and (c) or (I-1).

Suitable quaternary nitrogen atom-containing polyols in the latter are the same one as mentioned (I-1). The same alkylene oxides as above can be used.

(I-3) POLYESTER POLYOL CONTAINING QUAT.-N

Suitable quaternary nitrogen atom-containing polyester polyols include those obtainable by polycondensation of a polycarboxylic acid (or an ester, anhydride or halide thereof) and/or a hydroxycarboxylic acid with a tertiary or quaternary nitrogen atom-containing polyol with or without some other polyol (s) (followed by quaternization in the case where a tertiary nitrogen atom-containing polyol is used); and those obtainable by ring opening polymerization of a lactane using as the initiator a tertiary or quaternary nitrogen atom-containing polyol (followed by quaternization in case a tertiary nitrogen atom-containing polyol is used).

Suitable examples of the tertiary or quaternary nitrogen atom-containing polyols include low-molecular weight poloyls as described in (I-1) and polyether polyols as described in (I-2).

Suitable polycarboxylic acids include dicarboxylic acids such as succinic acid, adipic acid, sebacic acid, maleic acid, fumaric acid, phthalic acid, terephthalic acid and dimer acids; suitable esters include lower alkyl esters (such as methyl esters) of these acids; and suitable halides include chlorides of these acids. Suitable hydroxycarboxylic acids include ε-hydroxycaproic acid. Suitable examples of the other polyols to be used if necessary include low molecular weight polyols (such as ethylene glycol, propylene glycol, butanediols, hexanediols, diethylene glycol; trimethylol propane, glycerol and the like) and polyether polyols (such as polyethyleneglycols, polypropyleneglycols, polytetramethyleneetherglycols and the like).

Suitable lactones include, for example, ε-caprolactone.

The molecular weight of the quaternary nitrogen atom-containing polyether or polyester can vary widely. When it is used as at least a part of (B), its equivalent weight (molecular weight per OH group) is usually at least 300 preferably 500–4,000.

Among these quaternary nitrogen atom-containing polyols (D), the preferred are the low molecular weight polyols and the polyether polyols (in view of good dyeability characteristics); and the more preferred are the low-molecular weight polyols (especially the quaternization products of alkyldialkanolamines or N,N′-dihydroxyalkylpiperazines).

In preparing polyurethane resins, soluble in organic solvents, suitable for producing sheet materials, the quaternary nitrogen atom-containing diols ($D_1$) (low-molecular weight diols, polyether diols and polyester diols) are generally used as (D).

[II] LOW-MOLECULAR POLYFUNCTIONAL COMPOUND

The low-molecular weight polyfunctional, active hydrogen atom-containing compound (C) to be used in the present invention has an equivalent weight (a molecular weight per functional group) of generally 300 or less, preferably 30–250.

At least a part of the low-molecular weight compound (C) must be a low-molecular polyfunctional compound (E) having neither quaternary nitrogen atom nor tertiary nitrogen atom. Suitable examples of such compounds (E) include low-molecular weight polyols ($E_a$) having no nitrogen atom, low-molecular weight primary- and/or secondary polyamines ($E_b$), low-weight hydroxy compounds ($E_c$) having an active hydrogen atom-containing amino group, and combinations of two or more of these (such as combinations of $E_a$ and $E_b$, etc.) ($E_c$) may contain a plurality of hydroxyl groups and/or amino groups.

Suitable examples of the low molecular weight polyols ($E_a$) include aliphatic polyols (such as ethylene glycol, propylene glycol, 1,4-butanediol, 1,5-pentanediol, 1,6-hexanediol, 2,2-dimethyl-1,3-propanediol, cyclohexane-1,4-diol, diethylene glycol, glycerine and trimethylolpropane), polyols having benzene nucleus [such as p,p′-diphenylolalkane (bisphenol A etc.) and 1,4-phenylenebis(2-hydroxyethylether)] and two or more of these.

Suitable low weight polyamides ($E_b$) having at least two amino groups (primary and/or secondary) include, for example, aliphatic polyamines (such as ethylenediamine, propylenediamine, trimethylenediamine, butylenediamine and hexamethylenediamine), alicyclic polyamines (such as 1,3-cyclohexanediamine and 4,4′-methylenedicyclohexanediamine), heterocyclic polyamines (such as piperidine, N-aminoethylpiperidine and 1,4-diaminopiperidine), aromatic polyamines (such as phenylenediamine, xylylene diamine, 4,4′-diaminodiphenylmethane, tolylenediamine and 3,3′-dichloro-4,4′-diaminodiphenylmethane), hydrazines (such as hydrazine and monoalkylhydrazine), dihydrazides (such as succinic acid dihydrazide, adipic acid dihydrazide, isophthalic acid dihydrazide and terephthalic acid dihydrazide) and two or more of these.

Suitable compounds ($E_c$) having at least one hydroxyl group as well as at least one active hydrogen atom-containing amino group in the molecule include, for example, ethanolamine, 3-aminopropyl alcohol, 2-hydroxyethylethylenediamine, N-2-hydroxyethylpiperidine, diethanolamine, N-2-aminophenol and ethylene oxide (2 moles) adduct with xylylene diamine.

Among these, in view of the fact that resins or sheet materials with good mechanical strength and high softening points are obtained, the preferred are aliphatic polyols, aromatic polyamines (especially 4,4′-diaminodiphenylmethane), hydrazines and dihydrazides; and the more preferred are aliphatic polyols (especially alkane diols such as ethylene glycol and 1,4-butanediol).

The compound (E) can be used as the whole of (C) [in case the quaternary nitrogen atom-containing polyether or polyester is used as (D)]; but it is preferable to use as (C) the above-mentioned quaternary nitrogen atom-containing low-molecular weight polyol (D) having an equivalent weight of generally 300 or less, besides the above-mentioned (E).

If desired, there can be used, in conjunction with (E) or (E) and (D), other low-molecular weight polyfunctional compounds, for example, tertiary nitrogen atom-containing polyhydroxy compounds or salts thereof (salts with organic or inorganic acids) as described in (I-1) as the precursors of (D), so far as they do not interfere with the objects of the invention. When used, said compounds or salts thereof other than (E) and (D) generally amount to 20 equivalent % or less, preferably to 10 equivalent % or less, of (C).

For resins for producing sheet materials, low-molecular weight bifunctional, compounds ($C_1$) having two active hydrogen atom-containing groups are generally used as (C).

[III] HIGH-MACROMOLECULAR POLYOL

The high-macromolecular polyol (B) to be used in this invention has an equivalent weight of generally greater than 300, preferably 500–4,000. As such a macromolecular polyol may be used the above-mentioned quaternary nitrogen atom-containing polyether polyol or polyester polyol (D) or a macromolecular polyol (F) having no quaternary nitrogen atom, or a combination thereof. As the macromolecular polyols (F) having no quaternary nitrogen atom, any of the conventional ones can be used. Suitable ones include, for example, polyether polyols and polyester polyols.

Suitable polyether polyols include alkylene oxide addition products of active hydrogen atom-containing compounds such as polyhydroxy compounds. Suitable polyhydroxy compounds include low-molecular weight polyols such as ethylene glycol, propylene glycol, 1,4-butanediol, 1,6-hexanediol, diethylene glycol, neopentyl glycol, bis(hydroxymethyl)cyclohexane, bis(hydroxyethyl)-benzene, glycerine, trimethylolpropane and triethanolamine; and polyhydric phenols such as catechol, resorcin, hydroquinone and bisphenols. Suitable alkylene oxides include alkylene oxides having 2 to 4 carbon atoms, such as ethylene oxide, propylene oxide, 1,2-, 2,3- or 1,3-butylene oxide, tetrahydrofuran and two or more of these. The addition of alkylene oxide to the low-molecular polyols may be carried out in the usual way. In the case of adding two or more kinds of alkylene oxides, either block- or random-addition may be employed.

Suitable polyester polyols include condensed polyester polyols obtained by reacting polyols (low molecular weight polyols or polyether polyols) (or derivatives thereof) with polycarboxylic acids, and polyester polyols obtained by ring-opening polymerization of lactones with an initiator (such as glycol, glycerine and trimethylol propane). Suitable examples of the polyols, the polycarboxylic acids (or derivative thereof) and the lactones are the same ones as described in (I-3).

If necessary, other macromolecular polyols, for example tertiary nitrogen atom-containing macromolecular polyols (polyether polyols and polyester polyols as described in (I-2) and (I-3) or the salts thereof (salts with organic or inorganic acids), polymer polyols derived from polyols (such as polyether polyols or polyester polyols) and ethylenically unsaturated monomers (such as acrylonitrile and/or styrene), and polybutadiene polyols may also be used as a part of (B), so long as they do not interfere with the objects of this invention. When used, these polyols generally amount to 20 equivalent % or less, preferably to 10 equivalent % or less, of (B).

Among these macromolecular polyols (F) the preferred are polyether diols (especially polytetramethylene glycol) and polyester diols (especially polytetramethylene adipate and polycaprolactone diol).

For resins for producing sheet materials, high molecular diols ($B_1$) are generally used as (B).

[IV] ORGANIC DIISOCYANATE

Suitable organic diisocyanates include aromatic diisocyanates such as 2,4-and 2,6-tolylene diisocyanate, 4,4'-diphenylmethane diisocyanate and 1,5-naphthalene diisocyanate; m- or p- xylylene diisocyanate; alicyclic diisocyanates such as isophorone diisocyanate, 1,4-cyclohexane diisocyanate, and methylenebis(4-cyclohexyl)- diisocyanate; aliphatic diisocyanates such as 1,4-tetramethylene diisocyanate and 1,6-hexamethylene diisocyanate.

Among the above mentioned organic diisocyanates, the preferred are aromatic diisocyanates and the more preferred is 4,4'-diphenylmethane diisocyanate, in view of the fact that resins or sheet materials with good physical characteristics are obtained.

[V] PRODUCTION OF POLYURETHANE RESIN

In this invention, the quaternary nitrogen atom-containing polyol (D) is used as a part of the active hydrogen atom-containing compound. The amount of (D) to be used is such that the quaternary nitrogen atom content (calculated value on the assumption that 100% of the starting materials have reacted) in the product urethane resin amounts generally to 0.05–0.23% by weight, preferably to 0.08–0.2% by weight. When the quaternary nitrogen atom content is less than 0.05% by weight, poor dyeability results. If it exceeds 0.23% by weight, decreased physical characteristics and water resistance result when resin films or sheet materials are made.

The polyfunctional compound (E) must be used as at least a part of (C). The amount of (E) to be used is generally at least 40% [based on the equivalent of (C)]. When (E) amounts to less than 40 equivalent % of (C), there is a tendency toward decreased softening point and decreased physical strength. Preferable amount of (E), when low-molecular weight (D) is used, is at least 40% (especially at least 65%) and at most 95% ( especially at most 90%) in case of the low-molecular weight polyol (Ea), or at least 50% (especially at least 70%) and at most 90% (especially at most 85%) in case of the low-molecular weight polyamine (Eb); and in case of amino group-containing hydroxy compound (Ec), or in case of combinations of two or more of (Ea), (Eb) and (Ec), the preferable amount can be determined by averaging or allotting proportionally the above amounts. When high-molecular (D) is used, the amount of (E) in (C) is usually at least 80%, preferably at least 90%, most preferably 100%.

The equivalent ratio of (B) to (C) is 1:0.5 or more, preferably 1:0.8–8. When the low-molecular weight polyol (Ea) is used, 1:2–8 is more preferable. In case (C) amounts to less than 0.5, the mechanical strength and softening point of the resin or sheet material are often small and low, respectively.

The amount of (D) to be used in this invention is generally at least 3% (preferably at least 4%) and at most 30% (preferably at most 20%), the amount of (B) is generally at least 5% (preferably at least 10%) and at most 50% (preferably at most 40%), and the amount of (E) is usually at least 40% (preferably at least 50%), based on the equivalent of the active hydrogen atom-containing compounds in total.

The average molecular weight of the active hydrogen atom-containing compounds is usually at least 300 (preferably at least 400) and at most 1000 (preferably at most 750).

In producing the polyurethane resins according to the invention, the equivalent ratio of NCO group of (A) to active hydrogen atom-containing groups (OH, $NH_2$, NH) of the active hydrogen atom-containing compounds in total is usually 1:09–1.1, preferably substantially 1.

In case the ratio is beyond the limits of the above generally empolyed range, it becomes difficult to produce polyurethane resins with high degrees of polymerization and decreased dyeing characteristics (especially color fastness or rubbing) of polyurethane resins or sheet materials result.

The process for producing the polyurethane resins may be any of the known processes, such as [1] one-shot process, e.g. the process comprising reacting the organic diisocyanate (A) and all the active hydrogen atom containing compounds at one time; and [2] prepolymer process, e.g. (1) the process comprising reacting (A) with the active hydrogen atom containing compounds except (E) and chain-extending the resulting NCO-terminated prepolymer with (E), or (2) the process comprising reacting (A) with the active hydrogen atom-containing compounds except (D) (low molecular weight one) and (E) and chain-extending the resulting NCO-terminated prepolymer with (E) and (D). Among these processes the one-shot process is preferred when the simplification of the manufacturing process is taken into consideration.

The above-mentioned production may be carried out in the presence of or in the absence of a solvent. Suitable solvents include, for example, amides [such as dimethylformamide (hereinafter referred to as DMF), dimethylacetamide, diethylformamide, tetramethylene urea, N-methyl pyrrolidone and hexamethylphosphoramide, sulfoxides [such as dimethylsulfoxide (hereinafter referred to as DMSO)], ethers (such as dioxane and tetrahydrofuran), ketones (such as cyclohexanone and methyl ethyl ketone), esters (such as ethylacetate), aromatic hydrocarbons (such as toluene) and mixtures thereof. The preferred are amides and sulfoxides, and the more preferred are DMF and DMSO, for the practical use.

In producing polyurethane resins according to invention, the reaction temperature may be the same as the one generally employed for urethane bond-forming reactions. In the case of a one-shot process, it is generally 40°–80° C. (preferably 50°–70° C.) when a solvent is used, or generally 100°–220° C. (preferably 150°–200° C.) when no solvent is used. In the case of prepolymer process, an NCO-terminated prepolymer is prepared at a temperature of generally 30°–90° C. (preferably 40°–70° C.); and the chain extension reaction is carried out at generally 40°–80° C. (preferably 50°–70° C.) when a solvent is used, or generally 100°–220° C. (preferably 140°–190° C.) when no solvent is used.

The reaction may be carried out in the presence of a catalyst if necessary. Suitable examples of the catalysts are amino compounds [such as triethanolamine, N-ethylmorpholine, triethylene diamine, 1,8-diazabicyclo-[5,4,0]undecene-7 and its salt], tin compounds (such as trimethyl tin laurate, trimethyl tin hydroxide, dimethyl tin dilaurate and dibutyl tin dilaurate) and lead compounds (such as lead oleate).

If necessary, chain terminators such as monohydric alcohols (methanol, butanol, lauryl alcohol, cyclohexanol[4] benzyl alcohol and the like) and monoamines (methyl amine, butyl amine, decyl amine, dimethyl amine, cyclohexyl amine, aniline, etc.) may also be used. Such a terminator can be added in the end stage of reaction at the time when a desired viscosity is attained.

The production of polyurethane resins according to the invention can be conducted in manufacturing apparatuses commonly used. For processes without any solvent, such apparatuses as kneaders or extruders can be used.

As the polyurethane resins to be produced in this manner, those having a viscosity of 1,000–10,000,000 cps/20° C. as measured for a 30% (solids) by weight solution in DMF are useful from a practical standpoint, and preferably those having such viscosity of 10,000–1,000,000 cps/20° C. are especially useful from the standpoints of physical properties, dyeing properties and processability.

[VI] PRODUCTION OF SHEET AND DYEING

The sheet materials can be produced by conventional processes, for example, (1) the process which comprises applying to a substrate a solution of the polyurethane resin obtained; (2) the process which comprises blending the prepolymer component and the active hydrogen atom-containing components as such (in bulk) or as solutions and applying the blend to a substrate, to complete the reaction on the substrate.

A particularly useful process for producing the sheet materials according to this invention is a wet process. Such processes include, for example, a wet process which comprises applying (coating or impregnating) to a substrate a solution of the polyurethane resin (concentration: generally 5–30 weight %) in a solvent (such as DMF, DMSO), immersing the substrate into a coagulating bath containing a liquid (such as water) which is compatible with the solvent and is non-solvent for the polyurethane resin, extracting the solvent and drying the coagulated resin, and if necessary removing the substrate, to obtain a sheet; and a process which comprises coating the polyurethane resin solution on a releasing paper or a plastic film, followed by wet treatment or a drying to obtain a sheet; or a process in which the thus obtained sheets are adhered together to obtain another sheet. (The process may be repeated two or more times.)

The sheet material of this invention may be a sheet material composed of a substrate and a covering or dipping layer of the resin; or a sheet material without substrate, obtained by peeling off the substrate from the above-mentioned sheet material having substrate. As the substrate, various materials can be used, for example, napped fabrics, knits, fabrics, non-woven fabrics, papers and plastic films.

The sheet material thus obtained can be dyed with various types of dyes such as metal complex dyes (metallized dyes), acid dyes, basic dyes, direct dyes, reactive dyes, etc. Among these dyes, the preferred are metal complex dyes (1:2 type) and acid dyes.

The sheet material can be dyed by usual dyeing processes. Such dyeing processes include immersion process wherein the sheet material to be dyed is immersed into a dyeing bath in which a dye has been dissolved beforehand; printing process wherein the material to be dyed is printed of with a printing paste mixed with a dye; and vat dyeing process wherein a concentrated solution of a dye is uniformly applied to the material and squeezed, followed by operations such as dyeing, fixing, etc. to accomplish dyeing.

In an example of the immersion process, it is suitable that the amount of dye is 0.1–10 weight % based on the material to be dyed, bath ratio is 1:10 to 1:50 and the dyeing temperature is from room temperature to about 100° C. The solvents include water, methanol, acetone, etc.

The sheet material after dyeing is washed with water or the same containing a small amount of a surfactant to remove free dye, and is dried.

[VII] EFFECTS AND UTILITY

The polyurethane resins and the sheet materials obtained by the process of this invention have excellent physical properties such as mechanical strength (tensile strength, softening point, elongation and repetitive bending strength) and water resistance, and good storage stability. In addition, they have no or little tendency to discoloration, as well as improved dyeability (such as dye-receptivity and color fastness to light, washing and rubbing) especially when dyed with acid dyes and metal-containing dyes. Since the amount of quternary nitrogen atoms introduced can be held constant, resins and sheet materials with constant dyeing properties can be produced. In producing the resins, there is no fear of gelation during polymerization and decomposition and coloration of the polyurethane products during the reaction of the polyurethane products with the quaternizing agent (such as alkylating agent). Other effects are easier to coagulation in making wet process microporous sheet materials and more improved processability.

The polyurethane resins provided by the invention can be used for making elastic fibers (wet spun or dry spun), synthetic leathers, other microporous coatings, films, sheet materials, rubber-like elastomers, vehicles for ink, binders for magnetic paints, and the like, making use of their good elasticity, physical and dyeing properties.

The sheet materials (especially microporous sheet materials obtained by wet process) according to this invention have improved dyeability, smooth surface, good hand, nonshrinkage and noncurling tendencies and good film forming properties and are useful as leather substitutes for shoes, footwear, clothing, bags, furniture and car sheets.

Having generally described the invention, a more complete understanding can be obtained by reference to certain specific examples, which are included for purposes of illustration only and are not intended to be limiting unless otherwise specified. In the examples, % designates % by weight.

EXAMPLE 1

A 5-liter flask was charged with 487.5 g (0.25 mole) of polytetramethylene adipate diol having a molecular weight of 1950, 27.8 g (0.11 mole) of N, N-methylbutyldiethanolammonium bromide and 46.2 g (0.745 mole) of ethylene glycol. Then 1970.5 g of DMF was added. After complete dissolution, 284.0 g (1.138 moles) of 4,4'-diphenylmethanediisocyanate (MDI) was added, and the temperature of the mixture was maintained at 60°–65° C. The viscosity of the reaction system gradually increased, and after 15 hours of reaction there was obtained a clear, homogeneous polyurethane resin solution having a viscosity of 98,000 cps/20° C. The quaternary nitrogen atom content (calculated value) of the resin in this resin solution is 0.182% based on the resin. The content of the nitrogen-free, low-molecular polyol (ethylene glycol) is 87.1 equivalent % of the active hydrogen atoms-containing low-molecular weight compounds (C).

EXAMPLE 2

The polyurethane resin solution (resin concentration=30%) obtained in Example 1 was diluted with DMF to a resin concentration of 20%. The diluted solution was applied onto a glass plate to a thickness of 1 mm, then dried in an air-circulator drier at 70° C. for 4 hours, and peeled off from the glass plate to give a polyurethane film.

The polyurethane film had a very great mechanical strength, a high softening point and a good water resistance, as shown in Table 1.

EXAMPLE 3

A 20% polyurethane resin solution in DMF obtained in Example 2 was applied onto a glass plate to a thickness of 1 mm, the resin was wet coagulated in water for 20 minutes, and the coagulated resin sheet was peeled off from the glass plate and dried at 120° C. for 5 minutes to give a wet-process polyurethane sheet A (1-A) (sheets obtained by this process hereinafter called "A"). Separately, this 20% diluted solution was applied onto a raised nylon fabric by the aid of a doctor knife so that the amount of the solution reached 500 g/m² (wet), and the resin was wet coagulated in water over 20 minutes and dried at 120° C. for 5 minutes to obtain a wet-process polyurethane sheet B (1-B) (sheets obtained by this process hereinafter called "B").

The polyurethane film obtained in Example 2 as well as the wet-process polyurethane sheet A (1-A) and the wet-process polyurethane sheet B(1-B) were dyed using the following dye and dyeing method and each showed very excellent dyeing properties, as shown in Table 2.

Dye:
Lanasyn Red 2GL (manufactured by Mitsubishi Chemical Industries Ltd., metal-containing red dye, C. I. Acid Red 216)

Method of dyeing:
After adjustment of the dye concentration and bath ratio respectively 3% o.w.f and 1:40 based on the dyeable material, dyeing was carried out by using a dyeing tester, Color Master HD-24 (Tsujii Senki), while raising the temperature from 60° C. to 100° C. over 15 minutes and maintaining the temperature of 100° C. for 60 minutes. After the dyeing, the material was washed once with water, then washed in warm water at 50°–60° C. for 10 minutes, and dried.

EXAMPLE 4

Into a flask were charged 500 g (0.25 mole) of polytetramethylene glycol having a molecular weight of 2,000, 31.4 g (0.05 mole) of the compound represented by the formula

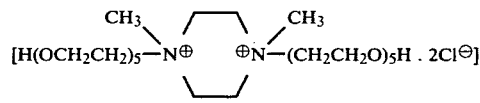

and 269 g (1.076 moles) of MDI, and allowed to react at 60° C. for 2 hours, to give an NCO-terminated prepolymer (NCO %=8.05%). To the prepolymer was added 2024 g of DMF to cause homogeneous dilution. Then 67.1 g (0.745 mole) of 1,4-butanediol was thrown into the flask, to cause chain extension reaction at 60° C. The viscosity of the solution increased as the reaction proceeded until, after about 20 hours, the viscosity reached 130,000 cps/20° C., when 10 g of methanol was added and stirring was continued for 4 additional hours. There was obtained a clear, homogeneous polyurethane resin solution. The quaternary nitrogen atom content (calculated value) of this resin was 0.16% based on the resin. The content of the nitrogen-free, low-molecular polyol (1,4-butanediol) was 100 equivalent % of (C).

EXAMPLE 5

A polyurethane film was made from the polyurethane resin solution obtained in Example 4 by the same procedure as in Example 2, and the mechanical strength of the film was evaluated. The results were as shown in Table 1.

A sheet A (2-A) and a sheet B (2-B) each obtained by the corresponding procedure as described in Example 3 from the polyurethane resin solution obtained in Example 4, when dyed using the following dye and method, showed very excellent dyeing properties as in Table 2.

Dye:
Kayanol Milling Yellow 5GW (manufactured by Nippon Kayaku Co., Ltd, C.I. Acid Yellow 217)

Method of dyeing:
Adjustment of the dye concentration and bath ratio to 3% o.w.f. and 1:40, respectively, based on the dyeable material was made with further addition of ammonium acetate (2 g/liter), and thereafter dyeing was conducted under the same dyeing conditions as in the dyeing process of Example 3.

EXAMPLE 6

An NCO-prepolymer (NCO %=7.01%) was obtained by reacting at 60° C. for 3 hours 1505 g (6.02 moles) of MDI with 4500 g (1 mole) of a quaternization product (molecular weight=4500) of a polyoxypropylated N-methyldiethanolamine with methyl chloride. Then, 1000 g of the NCO-prepolymer was thrown into a 3-liter stainless steel beaker together with 51.0 g (0.822 mole) of ethylene glycol, and the mixture, after one-minute stirring at 50°–60° C., was thrown into a continuous-type kneader. Bulk polymerization was carried out for 2 minutes while the reaction temperature was maintained at 180°–190° C., and polyurethane pellets were obtained by the usual method. The quaternary nitrogen atom content (calculated value) of the polyurethane resin was 0.22% based on the resin. The content of the nitrogen free low-molecular weight polyol (ethylene glycol) was 100 equivalent % of (C).

EXAMPLE 7

The polyurethane pellets obtained in Example 6 were dissolved in DMF to make a 20% resin solution, and a sheet A (3-A) was obtained by the same procedure as in Example 3.

The sheet A (3-A) when dyed with the following dye by the same method as in Example 3, showed very excellent dyeing properties as shown in Table 2.

Dye:
Lanasyn Yellow GIN(manufactured by Mitsubishi Chemical Industries, Ltd., metal-containing yellow dye, C.I. Acid Yellow 112 by C.I. generic name)

EXAMPLE 8

Into 6734 g of a mixed solvent (methyl ethyl ketone/toluene=1:1 by weight) were dissolved 3500 g (1 mole) of polycaprolactone polyol having a molecular weight of 3500, 1000 g (1 mole) of tetramethylene adipate diol (molecular weight 1000), 245 g (1 mole) of N,N-methylbenzyldiethanolammonium chloride and 2000 g (8 moles) of MDI, and the reaction was allowed to proceed at 60° C. for 4 hours to obtain a prepolymer component having an NCO % of 2.81%.

A hardener component was prepared by mixing 405 g (4.5 moles) of 1,4-butanediol and 1.8 g of dibutyltin dilaurate. Then, 1000 g of the prepolymer component and 28.6 g of the hardener component were blended uniformly, and the mixture was applied to a release paper to a thickness of 0.3 mm and heated at 140° C. for 5 minutes. After cooling, the release paper was peeled off, and the subsequent curing at 80° C. for 10 hours gave a polyurethane film. The quaternary nitrogen atom content of this polyurethane resin was 0.19% based on the resin. The content of the nitrogen free, low-molecular weight polyol (1,4-butanediol) was 81.8 equivalent % of (C).

EXAMPLE 9

Into a 5-liter flask were charged 500 g (0.25 mole) of polypropylene glycol having a molecular weight of 2000, 24.9 g (0.15 mole) of N,N-dimethyldiethanolammonium chloride and 55.8 g (0.90 mole) of ethylene glycol. After addition of 2125 g of DMF to cause dissolution, 330 g (1.32 moles) of MDI was added. While maintaining at 60°–65° C., the reaction was allowed to proceed, and after 18 hours of reaction there was obtained a clear, homogeneous polyurethane resin solution having a viscosity of 103,000 cps/20° C. (resin concentration=30%). The quaternary nitrogen atom content (calculated value) of this resin was 0.23% based on the resin. The content of the nitrogen free low-molecular polyol (ethylene glycol) was 85.7 equivalent % of (C).

EXAMPLE 10

A polyurethane film was made from the polyurethane resin solution obtained in Example 9 by the same procedure as in Example 2, and the mechanical strength of the film was evaluated. The polyurethane film had a great mechanical strength and a high softening point, as shown in Table 1.

EXAMPLE 11

A sheet A (4-A) was made as in Example 3 from the polyurethane resin solution obtained in Example 9. Separately, the polyurethane resin solution (resin concentration=30%) obtained in Example 9 was diluted with DMF to make a 20% resin solution. A raised nylon fabric was immersed in this solution, and squeezed with a mangle so that the raised nylon fabric retained 500 g/m$^2$ (wet) of the resin solution, wet coagulated in water for 20 minutes, and then dried at 120° C. for 3 minutes, to give a wet-process polyurethane sheet C (4-C).

The sheet A (4-A) and the sheet C (4-C) were dyed with the following dye by the same method as in Example 3, and each showed very excellent dyeing properties as shown in Table 2.

Dye:
Lanasyn Red 2GL

EXAMPLE 12

A 5-liter flask was charged with 404 g (0.25 mole) of polytetramethylene glycol with a molecular weight of 2020, 27.8 g (0.11 mole) of N,N-methylbutyldiethanolammonium bromide and 225 g (0.9 mole) of MDI and were reacted at a temperature of 60°–65° C. for 2 hours to form a prepolymer (NCO %=1.72). Thereafter, 1970 g of DMF was thrown into the flask to make a 25% prepolymer solution. While the flask was maintained at 20°–30° C., a solution of 105.3 g of 4,4'-diaminodiphenylmethane in DMF (316 g) was added, and the chain extension reaction was conducted at 40° C. With the progress of the reaction, the viscosity of the solution increased, and after 13 hours there was obtained a clear, homogeneous polyurethane resin solution with a viscosity of 56,000 cps/20° C.

The quaternary nitrogen atom content (calculated value) of this polyurethane resin was 0.20% based on the resin. The content of the low-molecular weight polyol was 82.9 equivalent % of (C).

EXAMPLE 13

The polyurethane resin solution (resin concentration=25%) obtained in Example 12 was diluted with DMF to a resin concentration of 20%, and the diluted solution was applied to a glass plate to a thickness of 1 mm, dried in an air-circulator drier at 70° C. for 4 hours and then peeled off from the glass plate, giving a polyurethane film.

The polyurethane film had a very great mechanical strength, a high softening point and a good water resistance, as shown in Table 1.

EXAMPLE 14

Using the 20% polyurethane resin solution in DMF obtained in Example 13 and proceeding as in Example 3, there were obtained a sheet A (5-A) and a sheet B (5-B). The polyurethane film obtained in Example 13 as well as the sheets A (5-A) and B (5-B) obtained in this example, when dyed with the following dye by the same method as in Example 3, showed very excellent dyeing properties as in Table 2.

Dye:
Lanasyn Red 2 GL

COMPARATIVE EXAMPLE

Into a 5-liter flask were charged 500 g (0.25 mole) of polypropyleneglycol having a molecular weight of 2000 and 24.9 g (0.15 mole) of N,N-dimethylethanolammonium chloride, then 1465 g of DMF was added to cause dissolution, and thereafter 10.3 g (0.412 mole) of MDI was added. The reaction was carried out while the temperature was maintained at 60°–65° C., and after 18 hours of reaction there was obtained a clear polyurethane resin solution having a viscosity of 300 cps/20° C. (resin concentration=30%). The quaternary nitrogen atom content (theoretical value) of this polyurethane resin was 0.33% based on the resin.

When this polyurethane resin solution was dropped into a large amount of water, an aqueous dispersion was formed. Further, this polyurethane resin solution was applied to a glass plate to a thickness of 1 mm, and dried in an air-circulator drier at 70° C. for 4 hours. The polyurethane resin coating film obtained was very sticky and low in mechanical strength, and its softening point, which was 80°–100° C., was also very low. This polyurethane resin was quite unsuited for use in synthetic leathers, for example.

TABLE 1

| Example No. | Example 2 | Example 5 | Example 10 | Example 13 |
|---|---|---|---|---|
| Tensile strength (kg/cm$^2$) | 710 | 650 | 620 | 762 |
| Elongation at break (%) | 600 | 600 | 680 | 650 |
| 100% Modulus (kg/cm$^2$) | 80 | 40 | 121 | 59 |
| Softening point (°C.) | 190 | 170 | 185 | 206 |
| Tensile strength after 7 days at 70° C., 100% R.H.(kg/cm$^2$) | 650 | | | 625 |
| Retention(%) | 91.5 | | | 82 |
| Tensile strength after 10 hours in steam (0.6kg/cm$^2$) at 110° C. (kg/cm$^2$) | 600 | | | 620 |
| Retention(%) | 84.5 | | | 81.4 |

TABLE 2

| Example No. Film or Sheet | | Example 3 Film | Example 3 (1-A) | Example 3 (1-B) | Example 5 (2-A) | Example 5 (2-B) | Example 7 (3-A) | Example 11 (4-A) | Example 11 (4-C) | Example 14 Film | Example 14 (5-A) | Example 14 (5-B) |
|---|---|---|---|---|---|---|---|---|---|---|---|---|
| Degree of dye exhaustion[1] % | | 98.0 | 99.9 | 95.2 | 98.5 | 92.3 | 99.7 | 99.8 | 96.2 | 98.6 | 99.8 | 96.3 |
| Color fastness to light[2] (Grade) | | 5 | 5 | 5 | 5 | 5 | 5 | 5 | 5 | 5 | 5 | 5 |
| Color fastness to rubbing[3] (Grade) | Dry | 5 | 5 | 5 | 5 | 5 | 5 | 5 | 5 | 5 | 5 | |
| | Wet | 4-5 | 4-5 | 4 | 5 | 4-5 | 5 | 5 | 4 | 4-5 | 4-5 | 4 |
| Color fastness to washing[4] | | | | | | | | | | | | |
| Color change (Grade) | | 5 | 5 | 5 | 5 | 5 | 5 | 5 | 5 | 5 | 5 | 5 |
| Staining (Grade) | Wool | 5 | 5 | 5 | 4-5 | 4 | 5 | 5 | 5 | 5 | 5 | 5 |
| | Rayon | 5 | 5 | 5 | 5 | 5 | 5 | 5 | 5 | 5 | 5 | 5 |
| | Silk | 5 | 5 | 4 | 4 | 3 | 3 | 5 | 4 | 5 | 5 | 4 |
| | Nylon | 4 | 4 | 2 | 5 | 3 | 5 | 4 | 2 | 4 | 4 | 2 |
| | Cotton | 5 | 5 | 5 | 5 | 5 | 5 | 5 | 5 | 5 | 5 | 5 |
| | Acetate | 5 | 5 | 5 | 5 | 3 | 5 | 5 | 5 | 5 | 5 | 5 |

Notes:
[1] Degree of dye exhaustion determined according to the following equation using the dye concentration of the dye solution before dyeing($C_1$) and the dye concentration of the residual solution after dyeing ($C_2$), determined by measuring the absorbances (Red: 500m ; Yellow: 440m ).

Degree of exhaustion = $\dfrac{C_1 - C_2}{C_1} \times 100$

[2] Color fastness to light according to JIS L 0842-1971 (Fade-Ometer test, 20 hours fading)
[3] Color fastness to light according to JIS L 0849-1971 (Gaku-Shin type rubbing test, 200 g load, 100 times)
[4] Color fastness to washing according to JIS L 0844-1970 (Method A-2 Launder-Ometer test)

What is claimed as new and desired to be secured by letters patent is:

1. A process for producing a water-insoluble, water-nondispersible and solvent-soluble polyurethane resin having a quaternary nitrogen atom content of 0.5–0.23% by weight, which comprises reacting an organic diisocyanate (A) with active hydrogen atom-containing compounds comprising a macromolecular polyol (B) and a low-molecule weight polyfunctional compound (C), wherein (1) a part of the active hydrogen atom-containing compounds is at least one quaternary nitrogen atom-containing polyol (D) selected from the group consisting of low-molecular weight polyols, polyether polyols and polyester polyols having at least one quaternary nitrogen atom, (2) 40–100 equivalent % of (C) is a low-molecular weight polyfunctional compound (E) having no nitrogen atom other than the functional group, and (3) the equivalent ratio of the NCO groups of (A) to active hydrogen atom-containing groups of the active hydrogen atom-containing compounds in total is 1:0.9–1.1.

2. The process of claim 1, wherein the equivalent ratio of (B) to (C) is 1: at least 0.5.

3. The process of claim 1, wherein (D) is a low-molecular weight diol, a polyether diol or a polyester diol, having at least one quaternary nitrogen atom, or a combination thereof.

4. The process of claim 1, wherein (D) is a quaternary nitrogen atom-containing low-molecular weight polyol.

5. The process of claim 4, wherein said low-molecular weight polyol is a quaternization product from a tertiary nitrogen atom-containing polyhydroxy compound having a molecular weight per hydroxyl group of 300 or less.

6. The process of claim 5, wherein said tertiary nitrogen atom-containing polyhydroxy compound is an alkyldialkanolamine or an N,N'-di(hydroxyalkyl)piperazine.

7. The process of claim 1, wherein (D) is a quaternary nitrogen atom-containing polyether or polyester having an equivalent weight of at least 300.

8. The process of claim 1, wherein (E) is at least one compound selected from the group consisting of low-molecular weight polyols having no nitrogen atom, low-molecular weight primary- and/or secondary polyamines, and low-molecular weight hydroxy compounds having primary or secondary amino group.

9. The process of claim 1, wherein (E) is a low-molecular weight polyol having no nitrogen atom.

10. The process of claim 1, wherein (E) is a low-molecular weight primary- and/or secondary polyamine.

11. The process of claim 1, wherein (D) is a quaternary nitrogen atom-containing low-molecular weight polyol and (E) is a low-molecular polyol containing no nitrogen atom.

12. A water-insoluble, water-nondispersible and solvent-soluble polyurethane resin having a quaternary nitrogen atom content of 0.05–0.23% by weight and having improved physical properties and improved dyeability, which has been obtained by reacting an organic diisocyanate (A) with active hydrogen atom-containing compounds comprising a macromolecular polyol (B) and a low-molecular weight polyfunctional compound (C), wherein (1) a part of the active hydrogen atom-containing compounds is at least one quaternary nitrogen atom-containing polyol (D) selected from the group consisting of low-molecular weight polyols, polyether polyols and polyester polyols having at least one quaternary nitrogen atom, (2) 40–100 equivalent % of (C) is a low-molecular weight polyfunctional compound (E) having no nitrogen atom other than the functional group, and (3) the equivalent ratio of the NCO groups of (A) to active hydrogen atom-containing groups of the active hydrogen atom-containing compounds in total is 1:0.9–1.1.

13. The resin of claim 12, which has a viscosity of 1,000–10,000,000 cps/20° C. as measured for a 30% (by weight) solution in dimethylformamide.

14. A process for producing sheet material comprising applying to a substrate a solution of water-insoluble, water-nondispersible polyurethane resin having a quaternary nitrogen atom content of 0.05–0.23% by weight, obtained by reacting an organic diisocyanate (A) with active hydrogen atom-containing compounds comprising a macromolecular diol ($B_1$) and a low-molecular weight bifunctional compound ($C_1$), wherein (1) a part of the active hydrogen atom-containing compounds is at least one quaternary nitrogen atom-containing diol ($D_1$) selected from the group consisting of low-molecular weight diols, polyether diols and polyester diols having at least one quaternary nitrogen atome, (2) 40–100 equivalent % of ($C_1$) is a low-molecular weight bifunctional compound ($E_1$) having no nitrogen atom other than the functional group, and (3) the equivalent ratio of the NCO groups of (A) to active hydrogen atom-containing groups of the active hydrogen atom-containing compounds in total is 1:0.9–1.1.

15. The process of claim 14, which comprises applying the solution to the substrate and then coagulating the solution applied on the substrate in a coagulating bath containing a liquid which is compatible with the solvent and is non-solvent for the polyurethane resin, and then if necessary removing the substrate.

16. A sheet material having improved physical properties and improved dyeabilities which comprises a layer formed by applying to a substrate a solution of a water-insoluble, water-nondispersable polyurethane resin having a quaternary nitrogen atom content of 0.05–0.23% by weight, obtained by reacting an organic diisocyanate (A) with active hydrogen atom-containing compounds comprising a macromolecular polyol (B) and a low-molecular weight polyfunctional compound (C), wherein (1) part of the active hydrogen atom-containing compounds is at least one quaternary nitrogen atom-containing polyol (D) selected from the group consisting of low-molecular weight polyols, polyether polyols and polyester polyols having at least one quaternary nitrogen atom, (2) 40–100 equivalent % of (C) is a low molecular weight polyfunctional compound (E) having no nitrogen atom other than the functional group, and (3) the equivalent ratio of NCO group of (A) to active hydrogen atom-containing group of the active hydrogen atom-containing compounds in total is 1:0.9–1.1, and immersing said substrate coated with said solution in a coagulating bath containing a liquid which is compatible with the solvent and is a non-solvent for the polyurethane resin.

17. The sheet material of claim 16, which is composed of the polyurethane resin and a substrate.

18. The sheet material of claim 17, wherein said substrate is selected from the group consisting of napped fabrics knit fabrics, non-woven fabrics, papers and plastic films.

19. The sheet material of claim 16, which is a microporous sheet material.

20. The sheet material of claim 16, which is obtained by a wet process.

21. The sheet material of claim 16, which is obtained by coagulating a layer of a solution of the polyurethane resin supported upon a substrate in a coagulating bath containing a liquid which is compatible with the solvent and is a non-solvent for the polyurethane resin and then removing the substrate.

22. The sheet material of claim 16, which is dyed with a dye.

23. A dyed sheet material, which is obtained by after-dyeing the sheet material of claim 16.

24. A polyurethane composition, which comprises a solution in a solvent of a water-insoluble, water-nondispersible polyurethane resin having a quaternary nitrogen atom content of 0.05–0.23% by weight and having improved physical properties and improved dyeability, which has been obtained by reacting an organic diisocyanate (A) with active hydrogen atom-containing compounds comprising a macromolecular polyol (B) and a low-molecular weight polyfunctional compound (C), wherein (1) a part of the active hydrogen atom-containing compounds is at least one quaternary nitrogen atom-containing polyol (D) selected from the group consisting of low-molecular weight polyols, polyether polyols and polyester polyols having at least one quaternary nitrogen atom, (2) 40–100 equivalent % of (C) is a low-molecular weight polyfunctional compound (E) having no nitrogen atom other than in the functional group, and (3) the equivalent ratio of the NCO groups of (A) to the active hydrogen atom-containing groups of the active hydrogen atom-containing compounds in total is 1:0.9–1.1.

25. The composition of claim 24, wherein the solvent is at least one solvent selected from the group consisting of amides, sulfoxides, ethers, ketones, esters, aromatic hydrocarbons and mixtures thereof.

26. The composition of claim 24, wherein the solvent is at least one solvent selected from the group consisting of amides and sulfoxides.

27. The composition of claim 24, wherein the solvent is at least one solvent selected from the group consisting of dimethylformamide and diemthylsulfoxide.

28. The composition of claim 24, 25, 26 or 27, wherein said polyurethane resin has been produced in the presence of said solvent.

29. The process of any one of claims 1 or 2–11, wherein (B) has an equivalent weight of 500–4000.

30. The process of any one of claims 1, or 2–11, wherein (E) has an equivalent weight of 30–250.

31. The process of claim 29 wherein (E) has an equivalent weight of 30–250.

* * * * *